United States Patent [19]

Schroeder et al.

[11] Patent Number: 4,728,630

[45] Date of Patent: Mar. 1, 1988

[54] RHODIUM ON CARBON CATALYST

[75] Inventors: Hobe Schroeder, Warrenville; Ricky L. Wittman, Montgomery, both of Ill.

[73] Assignee: Amoco Corporation, Chicago, Ill.

[21] Appl. No.: 905,758

[22] Filed: Sep. 9, 1986

Related U.S. Application Data

[63] Continuation-in-part of Ser. No. 785,055, Oct. 7, 1985, abandoned.

[51] Int. Cl.$^4$ .......................... B01J 23/40; B01J 27/06
[52] U.S. Cl. ..................................... 502/185; 502/181
[58] Field of Search ............................... 502/181, 185

[56] References Cited

U.S. PATENT DOCUMENTS

| | | | |
|---|---|---|---|
| 3,056,840 | 10/1962 | Howsmon, Jr. | 502/185 X |
| 3,383,406 | 5/1968 | Ochard et al. | 502/185 X |
| 3,557,219 | 1/1971 | Kehoe et al. | 502/185 X |
| 3,584,039 | 6/1971 | Meyer | 562/486 |
| 3,974,227 | 8/1976 | Berthoux et al. | 502/162 |
| 4,035,260 | 7/1977 | Schmitt, Jr. | 502/509 X |
| 4,246,177 | 1/1981 | Wu et al. | 549/356 |
| 4,375,550 | 3/1983 | Bird et al. | 564/417 X |
| 4,394,299 | 7/1983 | Puskas et al. | 502/185 |
| 4,405,809 | 9/1983 | Stech et al. | 562/487 |
| 4,467,110 | 8/1984 | Puskas et al. | 502/185 X |
| 4,501,685 | 2/1985 | Thomson et al. | 502/168 X |
| 4,506,092 | 3/1985 | Lentz et al. | 564/166 X |

FOREIGN PATENT DOCUMENTS 53-82742  7/1978  Japan .................................. 502/185

*Primary Examiner*—Helen M. S. Sneed
*Assistant Examiner*—William G. Wright
*Attorney, Agent, or Firm*—James R. Henes; William H. Magidson; Ralph C. Medhurst

[57] ABSTRACT

A particulate catalyst composition suitable for purification of terephthalic acid under reducing conditions and a method of preparation of such catalyst are disclosed. The catalyst composition includes catalytically active rhodium on a porous, granular, carbonaceous support material having a surface area of at least about 600 $m^2$/gram. Rhodium is present in an amount of about 0.01 to about 2 weight percent, based on the total weight of dry catalyst composition and calculated as elemental metal. In the presence of hydrogen, this catalyst exhibits a reduced terephthalic acid decomposition rate that is comparable to that for a palladium-on-carbon catalyst having the same catalyst metal loading. The catalyst is prepared by contacting a carbonaceous support material having a surface area of at least 600 $m^2$/gm and a pH value in its aqueous suspension of 9-11 with an aqueous rhodium salt solution having a pH of 1-4.

14 Claims, No Drawings

RHODIUM ON CARBON CATALYST

This is a continuation-in-part application of U.S. patent application Ser. No. 785,055 which was filed on Oct. 7, 1985 now abandoned.

BACKGROUND OF THE INVENTION

1. Field of the Invention

This invention relates generally to rhodium catalysts and to the preparation thereof, and more particularly concerns rhodium catalysts that are suitable for use in the purification of crude terephthalic acid and to the preparation of such catalysts.

2. Discussion of the Prior Art

Polymer grade or "purified" terephthalic acid is the starting material for polyethylene terephthalate, which is the principal polymer used for making polyester fibers, polyester films, and resins for bottles and the like containers. Purified terephthalic acid is derived from relatively less pure, technical grade or "crude" terephthalic acid by purification of the latter utilizing hydrogen and a noble metal catalyst as described in Meyer, U.S. Pat. No. 3,584,039 or Stech et al., U.S. Pat. No. 4,405,809. In the purification process, the impure terephthalic acid is dissolved in water at an elevated temperature and the resulting solution is hydrogenated, preferably in the presence of a hydrogenation catalyst containing a noble metal, typically palladium, on a carbon support, as described in Pohlmann, U.S. Pat. No. 3,726,915. This hydrogenation step converts the various color bodies present in the relatively impure terephthalic acid to colorless products.

Puskas et al., U.S. Pat. Nos. 4,394,299 and 4,467,110 disclose the use of a combination noble metal catalyst, for example, a palladium/rhodium catalyst on a porous carbonaceous surface, for purification of aqueous terephthalic acid solutions. The latter two patents also show the use of a rhodium-on-carbon catalyst under reducing conditions and review various heretofore known methods of preparing a Group VIII metal catalyst having activity and selectivity suitable for the purification of terephthalic acid by hydrogenating its principal impurity, 4-carboxybenzaldehyde, to p-toluic acid.

However, p-toluic acid is also an impurity that must be removed from the hydrogenated aqueous terephthalic solution. While such removal can be achieved to a large extent owing to the greater solubility of p-toluic acid, as compared to terephthalic acid in water, nevertheless substantial amounts of p-toluic acid are trapped within purified terephthalic acid crystals as the hydrogenated terephthalic acid solution is crystallized to recover purified terephthalic acid.

More recently it has been discovered in our laboratories and disclosed in copending U.S. patent application Ser. Nos. 785,321 and 785,322 concurrently filed with U.S. patent application Ser. No. 785,055, the parent of the present application, that the amount of p-toluic acid produced during purification of aqueous crude terephthalic acid solutions can be minimized by the use of a catalyst system in which different layers of an aforesaid palladium-on-carbon catalyst and of a rhodium-on-carbon catalyst are employed where the rhodium metal is supported on particulate active carbon. Such a catalyst system does not promote hydrogenation of 4-carboxybenzaldehyde to p-toluic acid but, instead, decarboxylates 4-carboxybenzaldehyde to benzoic acid, a by-product that is more soluble in water than p-toluic acid and thus is more readily separable from terephthalic acid upon crystallization of the latter.

Furthermore, it has been disclosed in Schroeder and James, U.S. patent application Ser. No. 905,766 filed Sept. 10, 1986 entitled "Method of Purification of Terephthalic Acid and Means Therefor" that the concurrent use of the aforesaid rhodium-on-carbon catalyst in a first layer and an aforesaid conventional palladium-on-carbon catalyst in a second layer in the purification reactor and the passage of a solution of crude terephthalic acid in sequence through the first layer and then through the second layer and in which the crude terephthalic acid is purified effects a decrease in the concentration of color bodies and fluorescent impurities in the resulting purified terephthalic acid, relative to the use of the conventional palladium-on-carbon catalyst alone.

However, commercially available rhodium-on-carbon catalysts tend to decompose considerable amounts of terephthalic acid to benzoic acid, thereby reducing the yield of purified terephthalic acid. Thus, it would be desirable to employ a rhodium-on-carbon catalyst that is selective toward decarbonylation of 4-carboxybenzaldehyde without the attendant conversion of substantial amounts of terephthalic acid to benzoic acid.

It has now been discovered that a rhodium-on-carbon catalyst having an enhanced selectivity for decarbonylation of 4-carboxybenzaldehyde to benzoic acid under reducing conditions and enhanced activity for the removal of color bodies and fluorescent impurities in the purification of crude terephthalic acid can be produced.

SUMMARY OF THE INVENTION

The present invention contemplates a particulate catalyst composition that is suitable for use in the purification of crude terephthalic acid solutions in a hydrogenation reactor. The catalyst composition of the present invention comprises catalytically active rhodium on a porous, granular carbonaceous support material having a surface area of at least about 600 $m^2$/gram. Rhodium is present on the support material in an amount of about 0.01 to about 2 weight percent, based on the total weight of the dry catalyst composition and rhodium being calculated as elemental metal. Additionally, the catalyst composition of the present invention exhibits a reduced terephthalic acid decomposition rate that is comparable to, or about the same as, that of palladium-on-carbon under the same conditions and at the same catalyst metal loading, and that is considerably less than the terephthalic acid decomposition rate of commercially available rhodium-on-carbon catalysts.

The present invention is also a method of making a rhodium-on-carbon catalyst, or a precursor thereof, which comprises: contacting an alkaline, granular, porous carbonaceous support material having a pH value of at least about 9, but no more than about 11 in an aqueous suspension and having a surface areas of at least about 600 $m^2$/gram, with an acidic, aqueous rhodium (3+) salt solution having a pH value of about 1 to about 4 for a time period to produce a wetted support material containing about 0.01 to about 2 weight percent of rhodium, calculated as the elemental metal and based on the weight of dry catalyst. The support material and aqueous rhodium salt solution are preselected such that the sum of the pH of the aqueous rhodium salt solution and pH of the aqueous suspension of support material is in the range of from about 12 to about 13.5. Preferably, a rhodium (3+) salt solution penetration to a depth of at least about 5 microns is obtained. Immediately after preparation and while wet, the present rhodium-on-carbon catalyst preferably exhibits a surface pH value of about 6 to about 8.

DETAILED DESCRIPTION OF THE PREFERRED EMBODIMENTS

The catalyst of this invention and formed by the method of this invention is particularly suitable for use in the purification of crude terephthalic acid prepared by the continuous catalytic liquid-phase oxidation of p-xylene with an oxygen-containing gas in a solvent. Suitable solvents for use in the catalytic, liquid-phase oxidation of p-xylene include any aliphatic $C_2$–$C_6$ monocarboxylic acid such as acetic acid, propionic acid, n-butyric acid, isobutyric acid, n-valeric acid, trimethylacetic acid, and caproic acid and water and mixtures thereof. Preferably, the solvent is a mixture of acetic acid and water, which more preferably contains from 1 to 20 weight percent of water, as introduced into the oxidation reactor. Since heat generated in the highly exothermic liquid-phase oxidation is dissipated at least partially by vaporization of solvent in the oxidation reactor, some of the solvent is withdrawn from the reactor as a vapor, which is then condensed and recycled to the reactor. In addition, some solvent is withdrawn from the reactor as a liquid in the product stream. After separation of the crude terephthalic acid product from the product stream, at least a portion of the mother liquor (solvent) in the resulting product stream is generally recycled to the reactor.

The source of molecular oxygen employed in the oxidation step of the method for producing purified terephthalic acid can vary in molecular oxygen content from that of air to oxygen gas. Air is the preferred source of molecular oxygen. In order to avoid the formation of explosive mixtures, the oxygen-containing gas fed to the reactor should provide an exhaust gas-vapor mixture containing from 0.5 to 8 volume percent oxygen (measured on a solvent-free basis). For example, a feed rate of the oxygen-containing gas sufficient to provide oxygen in the amount of from 1.5 to 2.8 moles per methyl group will provide such 0.5 to 8 volume percent of oxygen (measured on a solvent-free basis) in the gas-vapor mixture in the condenser.

The catalyst employed in the oxidation step of the method for producing crude terephthalic acid comprises cobalt, manganese, and bromine components and can additionally comprise accelerators known in the art. The weight ratio of cobalt (calculated as elemental cobalt) in the cobalt component of the catalyst-to-p-xylene in the liquid-phase oxidation is in the range of from about 0.2 to about 10 milligram atoms (mga) per gram mole of p-xylene. The weight ratio of manganese (calculated as elemental manganese) in the manganese component of the catalyst-to-cobalt (calculated as elemental cobalt) in the cobalt component of the catalyst in the liquid-phase oxidation is in the range of from about 0.2 to about 10 mga per mga of cobalt. The weight ratio of bromine (calculated as elemental bromine) in the bromine component of the catalyst-to-total cobalt and manganese (calculated as elemental cobalt and elemental manganese) in the cobalt and manganese components of the catalyst in the liquid-phase oxidation is in the range of from about 0.2 to about 1.5 mga per mga of total cobalt and manganese.

Each of the cobalt and manganese components can be provided in any of its known ionic or combined forms that provide soluble forms of cobalt, manganese, and bromine in the solvent in the reactor. For example, when the solvent is an acetic acid medium, cobalt and/or manganese carbonate, acetate tetrahydrate, and/or bromine can be employed. The 0.2:1.0 to 1.5:1.0 bromine-to-total cobalt and manganese milligram atom ratio is provided by a suitable source of bromine. Such bromine sources include elemental bromine ($Br_2$), ionic bromide (for example, HBr, NaBr, KBr, $HN_4Br$, etc.), or organic bromides which are known to provide bromide ions at the operating temperature of the oxidation (e.g., bromobenzenes, benzyl-bromide, mono- and di-bromoacetic acid, bromoacetyl bromide, tetrabromoethane, ethylene-dibromide, etc.). The total bromine in molecular bromine and ionic bromide is used to determine satisfaction of the elemental bromine-to-total cobalt and manganese milligram atom ratio of 0.2:1.0 to 1.5:1.0. The bromine ion released from the organic bromides at the oxidation operating conditions can be readily determined by known analytical means. Tetrabromoethane, for example, at at operating temperatures of 170° to 225° C. has been found to yield about 3 effective gram atoms of bromine per gram mole.

In operation, the minimum pressure at which the oxidation reactor is maintained is that pressure which will maintain a substantial liquid phase of the p-xylene and at least 70 percent of the solvent. The p-xylene and solvent not in the liquid phase because of vaporization are removed from the oxidation reactor as a vapor-gas mixture, condensed, and then returned to the oxidation reactor. When the solvent is an acetic acid-water mixture, suitable reaction gauge pressures in the oxidation reactor are in the range of from about 0 kg/cm$^2$ to about 35 kg/cm$^2$, and typically are in the range of from about 10 kg/cm$^2$ to about 30 kg/cm$^2$. The temperature range within the oxidation reactor is generally from about 120° C., preferably from about 150° C., to about 240° C., preferably to about 230° C. The solvent residence time in the oxidation reactor is generally from about 20 to about 150 minutes and preferably from about 30 to about 120 minutes.

Crude terephthalic acid produced by the liquid-phase oxidation of p-xylene is generally purified by reduction of the impurities therein, for example, by the methods disclosed in the aforesaid U.S. Pat. Nos. 3,584,039; 3,726,915; and 4,405,809. The purification step of the method for producing purified terephthalic acid is conducted at an elevated temperature and pressure in a fixed catalyst bed. The crude terephthalic acid to be purified is dissolved in water or a like polar solvent. Although water is the preferred solvent, other suitable polar solvents include the relatively lower molecular weight alkyl carboxylic acids, alone or admixed with water. Suitable reactor temperatures for use in this purification step are in the range of from about 100° C. to about 350° C. Preferably, the temperatures employed in the purification step are in the range of about 275° C. to about 300° C.

The pressure employed in the purification step depends primarily upon the temperature employed therein. Inasmuch as the temperatures at which practical amounts of the impure terephthalic acid may be dissolved in an aforesaid solvent are substantially above the normal boiling point of the solvent, the process pressures are necessarily considerably above atmospheric pressure to maintain the aqueous solution in liquid phase. If the reactor is hydraulically full, the reactor pressure can be controlled by the feed pumping rate. If the reactor has a head space, the reactor pressure can be maintained by gaseous hydrogen alone or in admixture with an inert gas such as water vapor and/or nitrogen in the head space. The use of an inert gas in admixture with hydrogen also can provide an advantageous means for modulating the reactor hydrogen partial pressure, especially at relatively low hydrogen partial pressures. To this end, the inert gas preferably is admixed with hydrogen prior to introduction into the reactor. In general, the reactor pressure during hydrogenation can be in the range of about 200 to about 1,500 pounds per square inch gauge (psig), and usually is in the range of about 900 psig to about 1,200 psig.

The reactor employed in the purification step can be operated in several modes. For example, a predetermined liquid level can be maintained in the reactor and hydrogen can be fed in, for any given reactor pressure, at a rate sufficient to maintain the predetermined liquid level. The difference between the actual reactor pressure and the vapor pressure of the terephthalic acid solution present is the hydrogen partial pressure in the reactor vapor space. Alternatively, if hydrogen is fed in admixture with an inert gas such as nitrogen, the difference between the actual reactor pressure and the vapor pressure of the terephthalic acid solution present is the combined partial pressure of hydrogen and the inert gas admixed therewith. In this case, the hydrogen partial pressure can be calculated from the known relative amounts of hydrogen and inert gas present in the admixture.

In yet another operating mode, the reactor can be filled with the terephthalic acid solution so as to provide no reactor vapor space. That is, the reactor can be operated as a hydraulically full system with dissolved hydrogen being fed to the reactor by flow control. In such an instance, the solution hydrogen concentration can be modulated by adjusting the hydrogen flow rate to the reactor. If desired, a pseudohydrogen partial pressure value can be calculated from the solution hydrogen concentration which, in turn, can be correlated with the hydrogen flow rate to the reactor.

In the operating mode where process control is effected by adjusting the hydrogen partial pressure, the hydrogen partial pressure in the reactor preferably is in the range of about 10 psi to about 200 psi, or higher, depending upon the service pressure rating of the reactor, the degree of contamination of the impure terephthalic acid, the activity and age of the particular catalyst employed, and like processing considerations.

In the operating mode where process control is effected by adjusting directly the hydrogen concentration in the feed solution, the latter usually is less than saturated with respect to hydrogen and the reactor itself is hydraulically full. Thus, an adjustment of the hydrogen flow rate to the reactor will result in the desired control of hydrogen concentration in the solution.

In general, the amount of hydrogen supplied to the purification reactor under reaction conditions is, of course, sufficient to effect the desired hydrogenation.

The space velocity reported as weight of crude terephthalic acid solution per weight of catalyst per hour in the purification step is from about 5 hours$^{-1}$ to about 25 hours$^{-1}$, preferably from about 10 hours$^{-1}$ to about 15 hours$^{-1}$. The residence time of the solution in the catalyst bed varies, depending upon the activity of the catalysts present.

The catalyst composition of the present invention and formed by the method of this invention is of the so-called "shell-type." That is major portion of the catalytically active rhodium is distributed in a relatively thin outer thickness layer, or shell, of the carbonaceous carrier or catalyst metal support material.

The porous carbonaceous support material can be any suitable granular active carbon having a surface area of at least about 600 m$^2$/gram (N$_2$; BET method), preferably about 800 m$^2$/gram to about 1,500 m$^2$/gram. It is critically important that the support material used in the method of this invention and in the preparation of the catalyst of this invention has a pH value of at least about 9, but no more than about 11 in aqueous suspension. Active carbon granules derived from coconut charcoal are preferred for this purpose. However, carbon granules derived from other plant sources or from animal sources are also suitable, provided the desired surface alkalinity is present. Whatever the source of the carbonaceous support material used in the method of this invention and in the preparation of the catalyst of this invention, excessive washing of the support material is to be avoided so as not to reduce the pH value thereof below about 9. Preferably, the carbonaceous support material used in the method of this invention has a pH value of about 10 to about 11 when in an aqueous suspension. A pH value of about 10.5 is particularly preferred.

The resulting rhodium catalyst composition freshly prepared by the method of this invention preferably has a surface that is substantially neutral. The surface pH value of the resulting catalyst composition when measured in its aqueous suspension immediately after impregnation—that is, during a period of up to one hour after impregnation—is preferably in the range of about 6 to about 8.

To prepare the catalyst composition of the present invention, the alkaline carbonaceous support material is impregnated with an acidic, aqueous rhodium (3+) solution to provide a wet surface layer, preferably to a depth of at least about 5 microns, more preferably to a depth of about 10 to about 20 microns. Suitable water soluble rhodium (3+) salts for the present purposes are rhodium trinitrate [Rh(NO$_3$)$_3$], hydrated rhodium trichloride [RhCl$_3$. xH$_2$O] and the like. Water soluble rhodium salt complexes such as sodium hexachlororhodium can also be used. The anion of the water-soluble rhodium (3+) salt used is not critical. However, anions that may have an adverse effect on catalytic activity and/or process equipment preferably are to be avoided, especially in instances where reduction of the rhodium (3+) cation to rhodium metal takes place in the reactor.

These salts function as rhodium catalyst precursors that are deposited onto and into the carbonaceous support material. The salts are subsequently reduced to catalytically active rhodium metal either as a separate step or, more commonly, upon introduction into a hydrogenation reactor for the purification of an aqueous solution of crude terephthalic acid under reducing conditions.

The concentration of the precursor rhodium (3+) salt solution used for impregnation can vary. Relatively high salt concentrations are preferred, especially at rhodium metal loadings below about 0.5 weight percent rhodium. Typically, an aqueous, concentrated rhodium (3+) salt solution is used as the starting material and is diluted to a desired concentration for impregnation, depending upon the mode of contacting with the carbonaceous support material. The rhodium (3+) concentration in the aqueous solution used for contacting can be in the range of about 0.0005M to about 0.5M. For contacting by spraying, a preferred rhodium (3+) concentration in the solution is about 0.1M, whereas for contacting by immersing or soaking the solution is generally less concentrated and preferably has a rhodium (3+) concentration of about 0.001M to about 0.1M, preferably about 0.02M.

The acidity of the rhodium (3+) salt solution used for impregnation is also very important. The pH value of the solution used for contacting the support material is in the range of about 1 to about 4, preferably about 1 to about 2. At a solution pH value of less than about 1, the rhodium (3+) salt is not readily absorbed by the carbonaceous support material. At a solution pH value greater than about 4, the rhodium (3+) salt tends to precipitate out, thereby producing a catalyst of impaired activity and performance.

During the contacting step, the objective is to substantially neutralize the surface alkalinity of the support material by the deposited rhodium metal catalyst precursor to a pH value of about 7. For a time period of up to about one hour after impregnation, the precursor-bearing catalyst support material usually exhibits a pH value of about 6 to about 8 when in an aqueous suspension. In general, if a relatively more alkaline support material is used, e.g., having a surface pH value of about 11, a relatively more acid aqueous salt solution, e.g., having a pH value of about 1, is used for contacting therewith. Similarly, support material that is relatively less alkaline, e.g., having a surface pH value of about 9.5, preferably is contacted with a relatively less acidic salt solution, e.g., a salt solution having a pH value of about 4. It is desirable to select the respective pH value of the carbonaceous support material and the salt solution so that the sum of these pH values is in the range of about 12 to about 13.5. Examples of suitable paired pH value for the support material and the salt solution are set forth in Table I, below.

TABLE I

| Paired pH Values | |
|---|---|
| Salt Solution | Support Material |
| 1 | 11 |
| 2 | 10.5 |
| 3 | 10 |
| 4 | 9.5 |

Most preferably, a carbonaceous support material having a pH value of about 10.5 in its aqueous suspension is selected and is contacted with a substantially saturated aqueous rhodium (3+) salt solution having a pH value of about 2. The acidity of the salt solution can be adjusted, if necessary, by the addition of a mineral acid such as nitric acid or hydrochloric acid, or with an alkali metal hydroxide such as sodium hydroxide, in a quantity sufficient to bring about the desired pH value adjustment.

Rhodium metal loading on the carbonaceous support material achieved by contacting of the salt solution with the support material as described above can be as high as about 2 weight percent, based on the total weight of dry catalyst composition. For a lesser degree of loading, the rhodium (3+) salt solution can be diluted or a lesser volumetric amount of the solution can be utilized. The overall range of rhodium metal loading on the carbonaceous support material is in the range of about 0.01 to about 2 weight percent. A rhodium metal loading of about 0.5 weight percent, based on the total weight of the dry catalyst, is preferred.

For uniform distribution of rhodium catalyst over the particulate support material, a liquid-to-solids ratio should be at least about 0.5, preferably about 0.5 to about 20, and more preferably about 0.5 to about 2, depending upon the mode of contacting used.

When the contacting of the carbonaceous support material and the aqueous rhodium (3+) salt solution with one another is carried out by spraying the solution onto the support material, an overall liquid-to-solids weight ratio of about 2 is desired. However, when the contacting is effected by immersing or soaking the carbonaceous support material in a bath containing the rhodium (3+) salt solution, the desired liquid-to-solids weight ratio is about 0.5.

For relatively lower rhodium metal loading, it si preferred to use a more dilute solution of the rhodium catalyst precursor.

The present invention is further illustrated by the following examples.

EXAMPLE 1

Coconut shell charcoal granules were sieved over a 8-mesh screen (U.S. Sieve Series), recovered, and then washed with distilled and deionized water over a 20-mesh screen (U.S. Sieve Series) to remove fines. The weight ratio of water-to-carbon was about 20:1. After washing, the carbon granules were found to contain about 65 weight percent moisture and to have a surface area of about 1056 m$^2$/gm, and a pH of 10.5 when measured in their aqueous suspension. The washed carbon granules (about 20 grams) were placed into a cylindrical vessel having a height-to-diameter ratio of about 3:1.

A 10-weight percent rhodium (3+) nitrate solution (Engelhard; pH −0.5) was diluted with distilled and deionized water in an amount sufficient to provide a solids-to-liquid weight ratio of about 0.5 when introduced into the aforementioned cylindrical vessel containing the washed carbon granules. The moisture content of the carbon granules was included in arriving at the aforementioned liquid-to-solids weight ratio. Prior to contacting with the carbon granules, the diluted rhodium (3+) nitrate solution had a rhodium (3+) concentration of about 0.05M and a pH value of about 1. The pH value of this solution was adjusted to about 2 with aqueous sodium hydroxide solution prior to contacting with the carbon granules.

The rhodium (3+) nitrate solution (27 ml; pH 2) was poured over the carbon granules contained within the cylindrical vessel within about three seconds. Thereafter the vessel was rotated by hand about five minutes and then left standing for about 18 hours. The rhodium (3+) nitrate solution introduced into the cylindrical vessel was observed to change color from amber to a hazy light yellow-green after about 20 minutes, and the pH of the aqueous suspension of the resulting rhodium-containing carbon granules was 7.7 for a period of one hour.

After standing about 18 hours, the rhodium (3+) nitrate-treated carbon granules were washed with distilled and deionized water in a liquid-to-solid weight ratio of about 20:1 and then air dried to a dry appearance. The moisture content of the air dried granules was found to be about 40 weight percent. The air-dried granules, containing rhodium metal catalyst precursor, were placed into a wire mesh basket, positioned within a titanium autoclave, and hot washed with distilled and deionized water, again at a liquid-to-solid weight ratio of about 20:1. The catalyst in the autoclave was washed at 560° F. The foregoing hot washing procedure was repeated three times.

The hot washed granules were then aged in the autoclave for 72 hours at about 530° F. and in the presence of an aqueous terephthalic acid solution and hydrogen.

The catalyst prepared in the foregoing manner contained about 1 weight percent rhodium, calculated as rhodium metal and based on the weight of dry catalyst composition.

EXAMPLE 2

The performance of the catalyst prepared in accordance with Example 1, above, was evaluated and compared with that of a similarly aged, commercially available rhodium-on-carbon catalyst (Rh/C) and a similarly aged commercially available palladium-on-carbon catalyst (Pd/C). The evaluation was carried out in a titanium autoclave having a capacity of one gallon.

Crude terephthalic acid (TA) (about 290 grams) was dissolved in water (about 1190 grams) at about 277° C. (about 530° F.), placed in the autoclave, and hydrogen at a pressure of about 50 psi at reactor temperature was added thereto. Thereafter the catalyst to be evaluated was placed in the autoclave, with or without additional inert carbon granules being present as a diluent.

An initial sample of the produced terephthalic acid (TA) solution was taken just before the catalyst was added, and thereafter at predetermined intervals. The samples were analyzed by liquid chromatography, and the amounts of 4-carboxybenzaldehyde (4-CBA), hydroxymethylbenzoic acid (HMBA), p-toluic acid (TOL), and benzoic acid (BA) present were determined.

The observed results are compiled in Tables II and III, below.

TABLE II

| Time (hr) | Parts Per Million Parts of TA, By Wt. | | | | |
|---|---|---|---|---|---|
| | 4-CBA | HMBA | TOL | BA | Totals |
| Catalyst of Example 1: 2 g 1% Rh/C + 2 g Carbon | | | | | |
| 0 | 2120 | 55 | ~500 | 140 | ~3400 |
| 0.5 | 936 | 403 | 616 | 1514 | 3469 |
| 1 | 339 | 443 | 658 | 2224 | 3664 |
| 2 | 43 | 367 | 743 | 2700 | 3853 |
| 3 | 24 | 292 | 829 | 2798 | 3943 |
| 4 | 6 | 217 | 824 | 3250 | 4297 |
| Johnson Matthey (Aesar): 2 g 1% Rh/C + 2 g Carbon | | | | | |
| 0 | 2516 | 112 | 409 | 312 | 3349 |
| 0.5 | 818 | 389 | 575 | 1792 | 3574 |
| 1 | 348 | 394 | 636 | 2330 | 3708 |
| 2 | 54 | 366 | 696 | 2988 | 4104 |
| 3 | 15 | 274 | 759 | 3663 | 4711 |
| 4 | 7 | 216 | 901 | 4463 | 5587 |
| Calsicat: 2 g 1% Pd/C + 2 g Carbon | | | | | |
| 0 | 2745 | 89 | 285 | 389 | 3508 |
| 0.5 | 845 | 1188 | 925 | 683 | 3641 |
| 1 | 328 | 1200 | 1336 | 899 | 3763 |
| 2 | 80 | 822 | 1791 | 1247 | 3940 |
| 3 | 39 | 544 | 2125 | 1380 | 4088 |
| 4 | 25 | 498 | 2322 | 1678 | 4523 |

TABLE III

| Time (hr) | Parts Per Million Parts of TA, By Wt. | | | | |
|---|---|---|---|---|---|
| | 4-CBA | HMBA | TOL | BA | Totals |
| Catalysts of Example 1: 4 g of 1% Rh/C | | | | | |
| 0 | 2414 | 253 | 504 | 400 | 3571 |
| 0.5 | 377 | 442 | 819 | 2128 | 3766 |
| 1 | 107 | 400 | 845 | 2249 | 3601 |
| 2 | 22 | 253 | 975 | 3311 | 4561 |
| 3 | 12 | 183 | 1067 | 3674 | 4936 |
| 4 | 6 | 109 | 1056 | 4454 | 5625 |
| Mathey Johnson (Aesar): 4 g of 1% Rh/C | | | | | |
| 0 | 2699 | 83 | 629 | 400 | 3811 |
| 0.5 | 299 | 632 | 1038 | 4734 | 6703 |
| 1 | 75 | 431 | 1001 | 4334 | 5841 |
| 2 | 15 | 250 | 1203 | 6404 | 7872 |
| 3 | N.D.* | 183 | 1381 | 8950 | 10514 |
| 4 | 1 | 114 | 1492 | 11500 | 13107 |
| Calsicat: 4 g of 1% Pd/C | | | | | |
| 0 | 2541 | 390 | 345 | 471 | 3747 |
| 0.5 | 284 | 931 | 831 | 1238 | 3284 |
| 1 | 87 | 627 | 2175 | 1501 | 4390 |
| 2 | 19 | 119 | 2192 | 1503 | 3833 |
| 3 | 12 | 108 | 2487 | 1739 | 4346 |
| 4 | 10 | 64 | 2812 | 2138 | 5024 |

*Not Detected

The results of Examples 1 and 2 shown in the Tables I and II indicate that the catalyst of the present invention decomposes terephthalic acid at a lower rate than commercially available rhodium-on-carbon catalysts and at about the same rate as commercial palladium-on-carbon catalysts at the same conditions. Specifically, from the increase in total amount of impurities over the four-hour period as compared to the amount initially present it can be seen that the terephthalic decomposition rate over four hours for the catalyst of Example 1 in Table II (about 0.08 wt-%) is less than one-half that for the commercially available rhodium-on-carbon catalyst (about 0.22 wt-%). Similarly, in Table III the terephthalic decomposition rate over four hours for the terephthalic catalyst of Example I (about 0.2 wt-%) is less than one-fourth that for the commercially available rhodium-on-carbon catalyst (about 0.9 wt-%).

EXAMPLE 3

The procedure, chemicals and apparatus employed in Example 1 were employed, except that 13.5 ml, instead of 27 ml, of the rhodium (3+) nitrate solution having a pH of 2 was employed to prepare the catalyst. Thus, the resulting catalyst contained about 0.5 weight percent of rhodium, calculated as elemental rhodium and based on the weight of dry catalyst composition. The pH of the aqueous suspension of the resulting rhodium-containing carbon granules was 7.7 for a period of one hour.

EXAMPLE 4

The procedure, chemicals and apparatus employed in Example 3 were employed, except that the pH of the rhodium nitrate solution was adjusted to 0.5, instead of 2, with aqueous nitric acid prior to contacting it with the carbon granules. The pH of the aqueous suspension of the resulting rhodium-containing carbon granules was 1.6 for a period of one hour.

EXAMPLE 5

The procedure, chemicals and apparatus employed in Example 2 were employed, except that instead the catalyst prepared in Examples 3 and 4 were tested. Neither of such catalysts were aged prior to use. The observed results are compiled in Table IV.

TABLE IV

| Time (hr) | Parts Per Million Parts of TA, By Wt. | | | | |
|---|---|---|---|---|---|
| | 4-CBA | HMBA | TOL | BA | Totals |
| Catalyst of Example 3 | | | | | |
| 0 | 2728 | 168 | 582 | 377 | 3855 |
| 0.5 | 268 | 681 | 910 | 2539 | 4398 |
| 1 | 88 | 468 | 989 | 2408 | 3953 |
| 2 | 17 | 249 | 1154 | 2891 | 4311 |
| 3 | 15 | 146 | 1183 | 3221 | 4565 |
| 4 | 5 | 97 | 1140 | 3416 | 4658 |
| Catalyst of Example 4 | | | | | |
| 0 | 2491 | 126 | 500 | 593 | 3710 |
| 0.5 | 866 | 391 | 633 | 3059 | 4949 |
| 1 | 326 | 414 | 611 | 3538 | 4889 |
| 2 | 59 | 367 | 770 | 4871 | 6067 |
| 3 | 26 | 307 | 917 | 5890 | 7140 |
| 4 | 30 | 270 | 940 | 6482 | 7722 |

EXAMPLE 6

The procedure, chemicals and apparatus employed in Example 3 were employed. The pH of the resulting rhodium-containing carbon granules was 7.7 for a period of one hour.

EXAMPLE 7

The procedure, chemicals and apparatus employed in Example 6 were employed, except that the pH of the rhodium nitrate solution was adjusted to 4 instead of 2, prior to contacting it with the carbon granules. The pH of the aqueous suspension of the resulting rhodium-containing carbon granules was 9.0 for a period of one hour.

EXAMPLE 8

The procedure, chemicals and apparatus employed in Example 5 were employed, except that the catalysts prepared in Examples 6 and 7 were both aged prior to testing. Both catalysts tested were similarly aged before testing. The observed results are compiled in Table V.

TABLE V

| Time (hr) | Parts Per Million Parts of TA, By Wt. | | | | |
|---|---|---|---|---|---|
| | 4-CBA | HMBA | TOL | BA | Totals |
| Catalyst of Example 6 | | | | | |
| 0 | 2315 | 176 | 394 | 450 | 3335 |
| 0.5 | 479 | 571 | 811 | 2001 | 3862 |
| 1 | 111 | 571 | 776 | 2371 | 3829 |
| 2 | 26 | 428 | 857 | 2815 | 4126 |
| 3 | 16 | 358 | 1025 | 3080 | 4479 |
| 4 | 8 | 272 | 1004 | 3221 | 4505 |
| Catalyst of Example 7 | | | | | |
| 0 | 2500 | 166 | 315 | 205 | 3286 |
| 0.5 | 943 | 502 | 960 | 2063 | 4468 |
| 1 | 398 | 540 | 918 | 2484 | 4340 |
| 2 | 73 | 531 | 1047 | 2944 | 4595 |
| 3 | 19 | 489 | 1180 | 3280 | 4968 |
| 4 | 6 | 441 | 1236 | 3547 | 5230 |

The results of Examples 3-8 shown in Tables IV and V illustrate the criticality of both the value of from about 1 to about 4 for the pH of the aqueous rhodium salt solution and the value of from about 12 to about 13.5 for the sum of the pH of the aqueous rhodium salt solution and of the pH of the aqueous suspension of the support material. Use of the catalysts prepared in Examples 3 and 6, by contrast to the use of the catalysts prepared in Examples 4 and 7, results in both higher catalytic activity for the decarbonylation of 4-carboxybenzaldehyde to benzoic acid and reduced decomposition of terephthalic acid to benzoic acid.

The foregoing discussion and the examples are intended as illustrative of the present invention and are not to be taken as limiting. Still other variations within the spirit and scope of this invention are possible and will present themselves to one skilled in the art.

Having described the invention, what is claimed is:

1. A method of making a rhodium-on-carbon composition which comprises:
   providing an alkaline, granular, porous carbonaceous catalyst support material having a surface area of at least about 600 $m^2$/gram and a pH value in an aqueous suspension of at least about 9 but no more than about 11; and
   contacting said alkaline support material with an aqueous rhodium (3+) salt solution having a pH value of from about 1 to about 4 for a time period to produce a wetted support material containing about 0.01 to about 2 weight percent rhodium, based on the weight of dry catalyst and calculated as elemental metal, wherein the support material and aqueous rhodium salt solution are preselected such that the sum of the pH of the aqueous rhodium salt solution and pH of the aqueous suspension of the support materials is in the range of from about 12 to about 13.5.

2. The method of claim 1 wherein the rhodium salt is rhodium trinitrate.

3. The method of claim 1 wherein the rhodium salt is hydrated rhodium trichloride.

4. The method of claim 1 wherein said resulting wetted support material contains about 0.5 weight percent rhodium, based on the weight of dry catalyst and calculated as elemental metal.

5. The method of claim 1 wherein the support material is contacted with the salt solution for a time to produce a wetted support material containing the salt solution to a depth of at least about 5 microns.

6. The method of claim 5 wherein said depth is about 10 to about 20 microns.

7. The method of claim 1 wherein the pH value of the support material in an aqueous suspension is about 10.5 and wherein the pH value of the rhodium (3+) salt solution is about 2.

8. The method of claim 1 wherein the rhodium salt contained in said wetted support material is reduced to rhodium metal.

9. The method of claim 1 wherein the support material is contacted with the salt solution for a time until, when measured immediately after impregnation so the resulting wet impregnated catalyst composition has a pH of about 6 to about 8.

10. The method of claim 1 wherein the weight ratio of liquid-to-solids being contacted with one another is at least about 0.5.

11. The method of claim 10 wherein the weight ratio of liquid-to-solids being contacted with one another is about 0.5 to about 20.

12. The method of claim 11 wherein the weight ratio of liquid-to-solids being contacted with one another is about 0.5 to about 2.

13. The method of claim 1 wherein said contacting is effected by soaking the support material in the salt solution.

14. The method of claim 1 wherein said contacting is effected by spraying the salt solution onto said support material.

* * * * *